(12) United States Patent
Limburg et al.

(10) Patent No.: US 7,363,785 B2
(45) Date of Patent: Apr. 29, 2008

(54) BLOCKING DEVICE FOR MOTOR VEHICLE STEERING SHAFT

(75) Inventors: Hans-Joachim Limburg, Schwabhausen (DE); Horst Zillmann, München (DE)

(73) Assignee: HUF Hulsbeck & Furst GmbH & Co KG, Velbert (DE)

( * ) Notice: Subject to any disclaimer, the term of this patent is extended or adjusted under 35 U.S.C. 154(b) by 187 days.

(21) Appl. No.: 10/548,312

(22) PCT Filed: Apr. 21, 2004

(86) PCT No.: PCT/EP2004/004220

§ 371 (c)(1), (2), (4) Date: Sep. 7, 2005

(87) PCT Pub. No.: WO2004/098961

PCT Pub. Date: Nov. 18, 2004

(65) Prior Publication Data

US 2006/0070414 A1  Apr. 6, 2006

(30) Foreign Application Priority Data

May 6, 2003  (DE) .............................. 103 20 138

(51) Int. Cl.
*B60R 25/02* (2006.01)
(52) U.S. Cl. ......................................... 70/186; 70/252
(58) Field of Classification Search .......... 70/182–186, 70/252
See application file for complete search history.

(56) References Cited

U.S. PATENT DOCUMENTS 1,786,186 A  12/1930  Bauermeister
2,874,562 A   2/1959  Cross
6,327,882 B1 * 12/2001 Canard ........................ 70/186
6,349,579 B1 *  2/2002 Canard ........................ 70/186
6,354,117 B1 *  3/2002 Canard ........................ 70/186
6,647,751 B2 * 11/2003 Zillmann ..................... 70/186
6,755,058 B2 *  6/2004 Zillmann ..................... 70/252
6,915,671 B2 *  7/2005 Zillmann ..................... 70/186
7,007,525 B2 *  3/2006 Okuno et al. ................ 70/186
7,121,126 B2 * 10/2006 Zillmann ..................... 70/186

(Continued)

FOREIGN PATENT DOCUMENTS

DE            506781          8/1930

(Continued)

*Primary Examiner*—Suzanne Dino Barrett
(74) *Attorney, Agent, or Firm*—Bacon & Thomas, PLLC

(57) ABSTRACT

A device for locking the steering shaft of a motor vehicle against rotation by means of a locking bolt cooperating with locking recesses of the steering shaft. A control member that can be rotated back and forth displaces the locking bolt back and forth radially relative to the axis of rotation of the control member between a locking position and a release position. The locking bolt has a laterally protruding pin that engages a spiral groove of the control member on the front face of the control member adjacent to the locking bolt and that winds about the axis of rotation of the control member. The locking bolt has a pin which is is spring-loaded and movable in the direction towards the control member. The control member can be rotated as far as into the position corresponding to the locking position of the locking bolt even if no locking recess of the steering shaft is located in front of the locking bolt to receive same.

6 Claims, 10 Drawing Sheets

U.S. PATENT DOCUMENTS

| | | | |
|---|---|---|---|
| 7,140,213 B2 * | 11/2006 | Feucht et al. | 70/186 |
| 7,260,963 B2 * | 8/2007 | Suzuki et al. | 70/186 |
| 2001/0025516 A1 * | 10/2001 | Starken | 70/186 |
| 2002/0116962 A1 | 8/2002 | Zillmann | |
| 2007/0113604 A1 * | 5/2007 | Khoury et al. | 70/186 |

FOREIGN PATENT DOCUMENTS

| | | |
|---|---|---|
| DE | 44 36 326 | 10/1995 |
| DE | 101 09 609 | 10/2002 |
| WO | WO 03/080407 | 10/2003 |

* cited by examiner

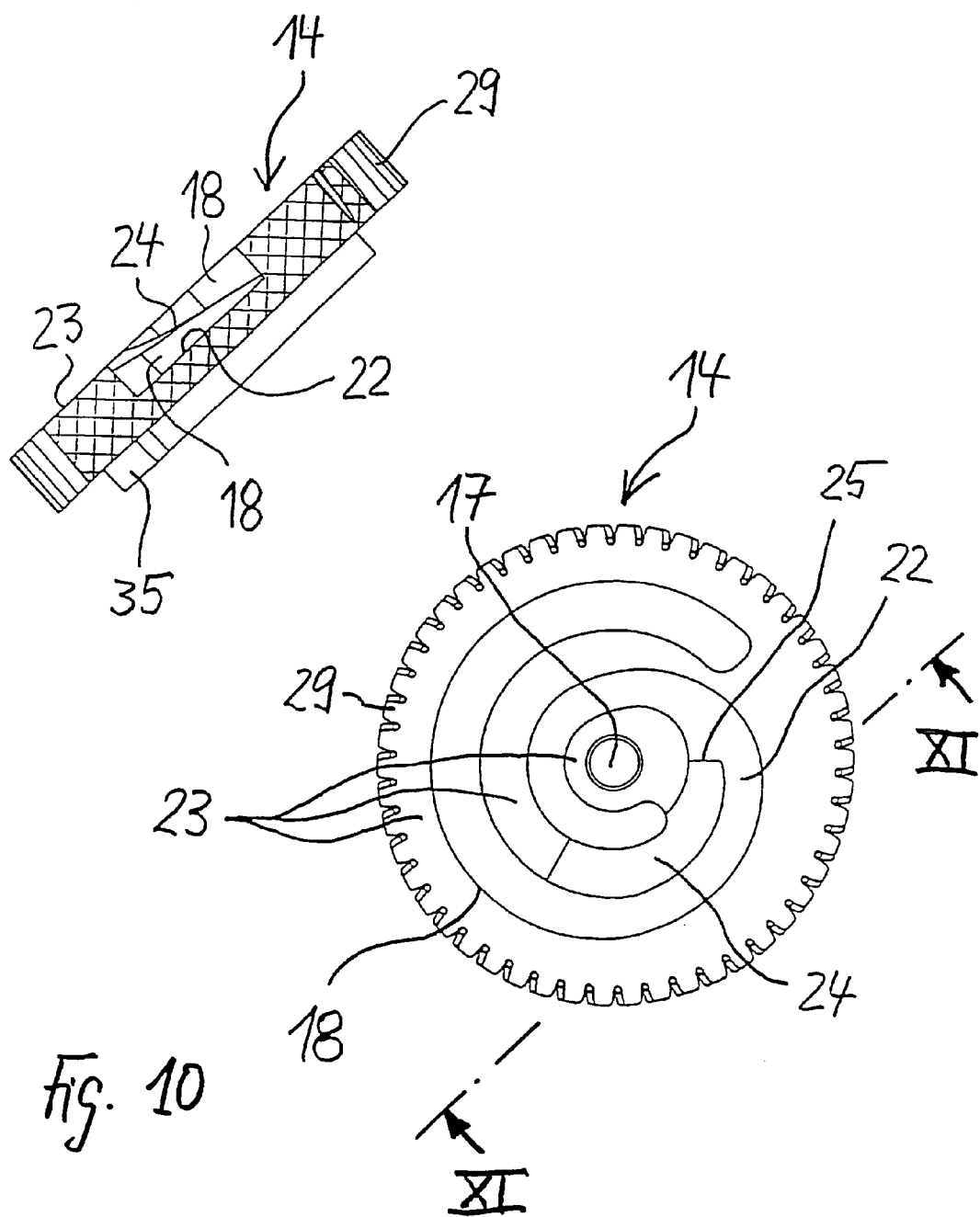

BLOCKING DEVICE FOR MOTOR VEHICLE STEERING SHAFT

BACKGROUND OF THE INVENTION

1. Field

The invention relates to a device for locking the steering shaft of a motor vehicle against rotation by means of a locking bolt that cooperates with locking recesses of the steering shaft and which, with the aid of a control member that can be rotated back and forth, is displaceable back and forth, radially relative to the axis of rotation of the control member between a locking position and a release position, and which with a laterally protruding pin engages a spiral groove of the control member that winds around the axis of rotation of the control member on the end face of the control member adjacent to the locking bolt.

2. Related Art

Such a device for locking the steering shaft of a motor vehicle so that it can no longer be rotated is known. In the known device, the locking bolt is made in two parts and is provided with a helical compression spring, against the action of which the locking bolt part cooperating with the locking recesses of the steering shaft and the locking bolt part cooperating with the control member can be pushed together when the control member is rotated into the position corresponding to the locking position of the locking bolt, but the locking bolt part that cooperates with the steering shaft cannot enter into any locking recess of the steering shaft, since the steering shaft is not in a rotary position where one of its locking recesses is aligned with this locking bolt part. The pin provided on the other locking bolt part and engaging the spiral groove of the control member constitutes an immovable lateral protrusion of this locking bolt part. The control member is made as a circular disk which can be rotated back and forth with the aid of a locking cylinder. This two-part design of the locking bolt with a helical compression spring is relatively complex and susceptible to malfunction (German Patent 506 781).

In another similar known device for locking the steering shaft of a motor vehicle against rotation, a one-piece locking bolt is provided whose laterally protruding pin is solidly joined to the locking bolt and which extends through a spiral slot in a circular control disk that can be rotated back and forth by means of a locking cylinder. The control disk can be rotated into the position corresponding to the locking position of the locking bolt only when a locking recess of the steering shaft is aligned with the locking bolt, and the locking bolt can enter the locking recess in order to assume its locking position (U.S. Pat. No. 1,786,186).

BRIEF SUMMARY OF THE INVENTION

The object of this invention is to provide a device of the type described at the beginning which is distinguished by a locking bolt having the least possible susceptibility to malfunction, which is both simple and economical in every respect, yet nevertheless wherein the control member can always be rotated into the position corresponding to the locking position of the locking bolt, regardless of the rotary position of the steering shaft at the time.

This object is attained according to the invention by the features recited in the characterizing portion of claim 1. Advantageous improvements of the device of the invention are disclosed in the remaining claims.

DESCRIPTION OF THE DRAWINGS

Below, one preferred embodiment of the device according to the invention for locking the steering shaft of a motor vehicle against rotation is described as an example, in conjunction with drawings. In the drawings:

FIG. 10 is a plan view on the end face of the control member that is provided with a spiral groove;

FIG. 11 is a section along the line XI-XI in FIG. 10.

DETAILED DESCRIPTION OF PREFERRED EMBODIMENTS OF THE INVENTION

Figure 1:
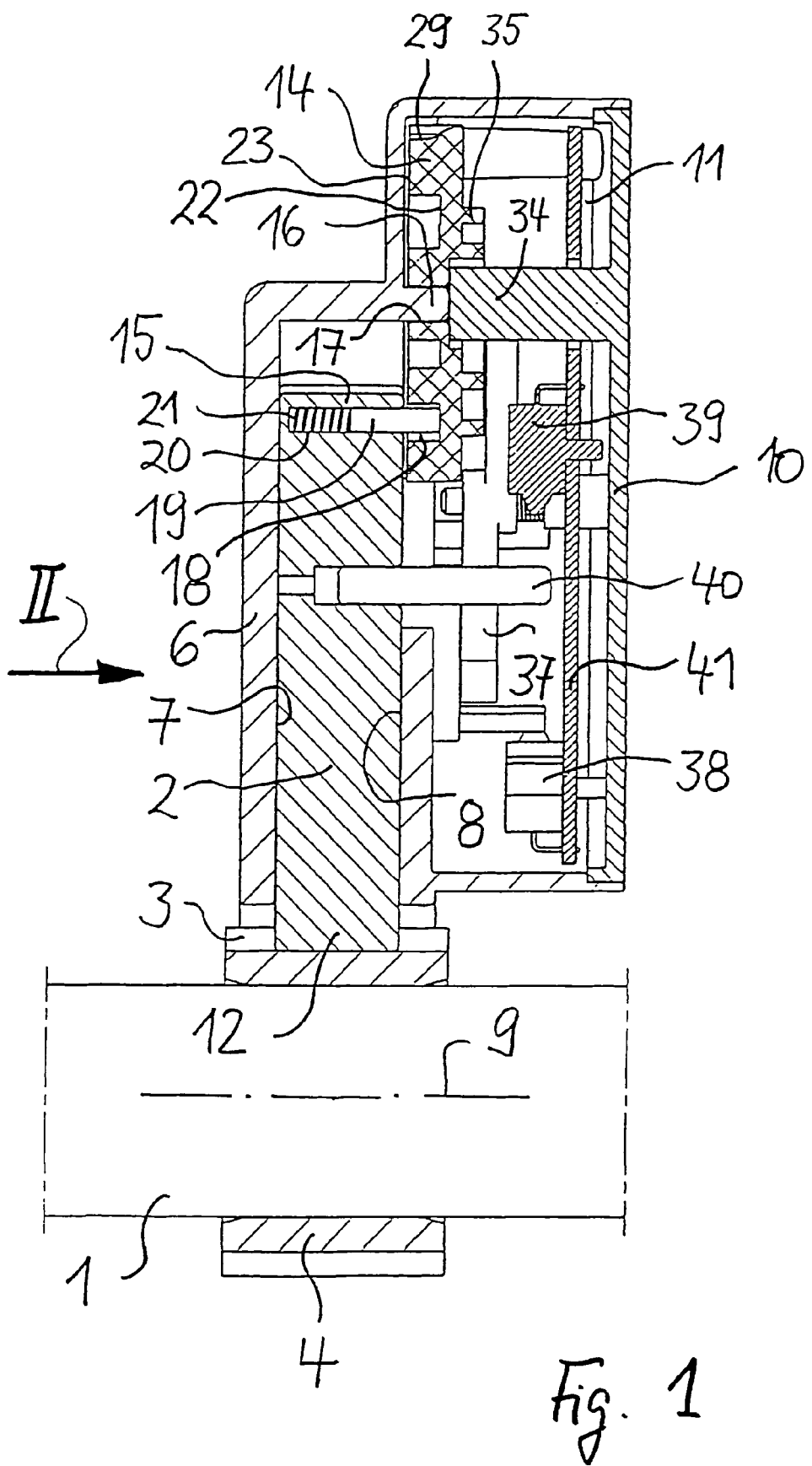
FIG. 1 is a longitudinal section along the line I-I in FIG. 2, in which the locking bolt is in its locking position.

The device shown for locking the steering shaft 1 of a motor vehicle against rotation has a one-piece locking bolt 2 which cooperates with groovelike locking recesses 3 of a locking sleeve 4 secured to the steering shaft 1. The steering shaft 1 and the locking sleeve 4 are surrounded by a tubular housing, not shown, with a through opening for the locking bolt 2.

The locking bolt 2 has a rectangular cross section and is supported axially displaceably in a duct 5 of corresponding cross section in a housing 6. The two broader side faces 7, 8 of the duct 5 each extend in a plane that is perpendicular to the common longitudinal axis 9 of the steering shaft 1 and of the tubular housing thereof that is coaxial with it. On the side remote from the duct 5, the housing 6 is provided with a mounting opening 11, closed by a cap 10, and the housing is secured to the tubular shaft housing.

Figure 2:
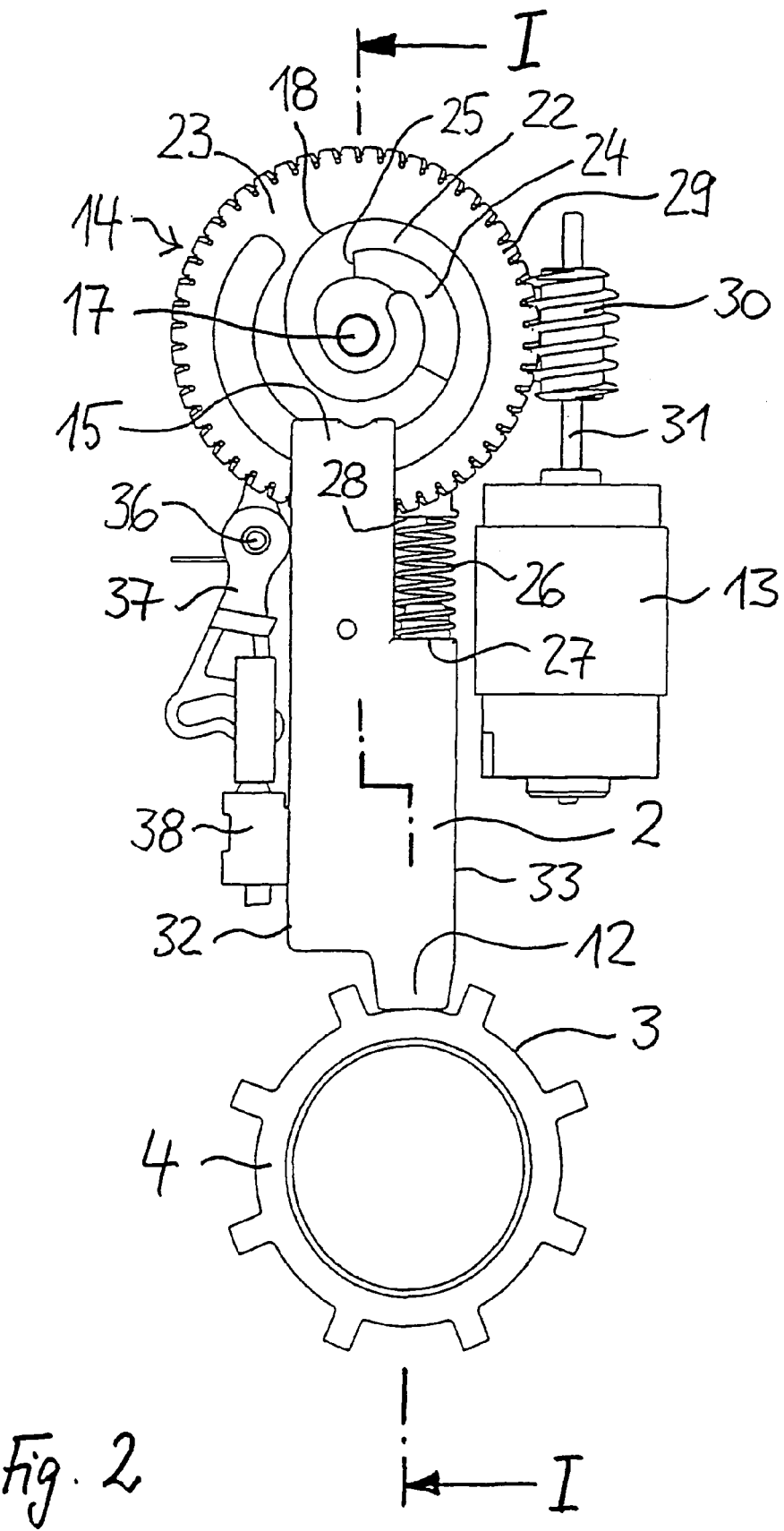
FIG. 2 is a view in the direction of the arrow II in FIG. 1, without the housing, housing cap and printed circuit board and without the steering shaft.
Figure 3:
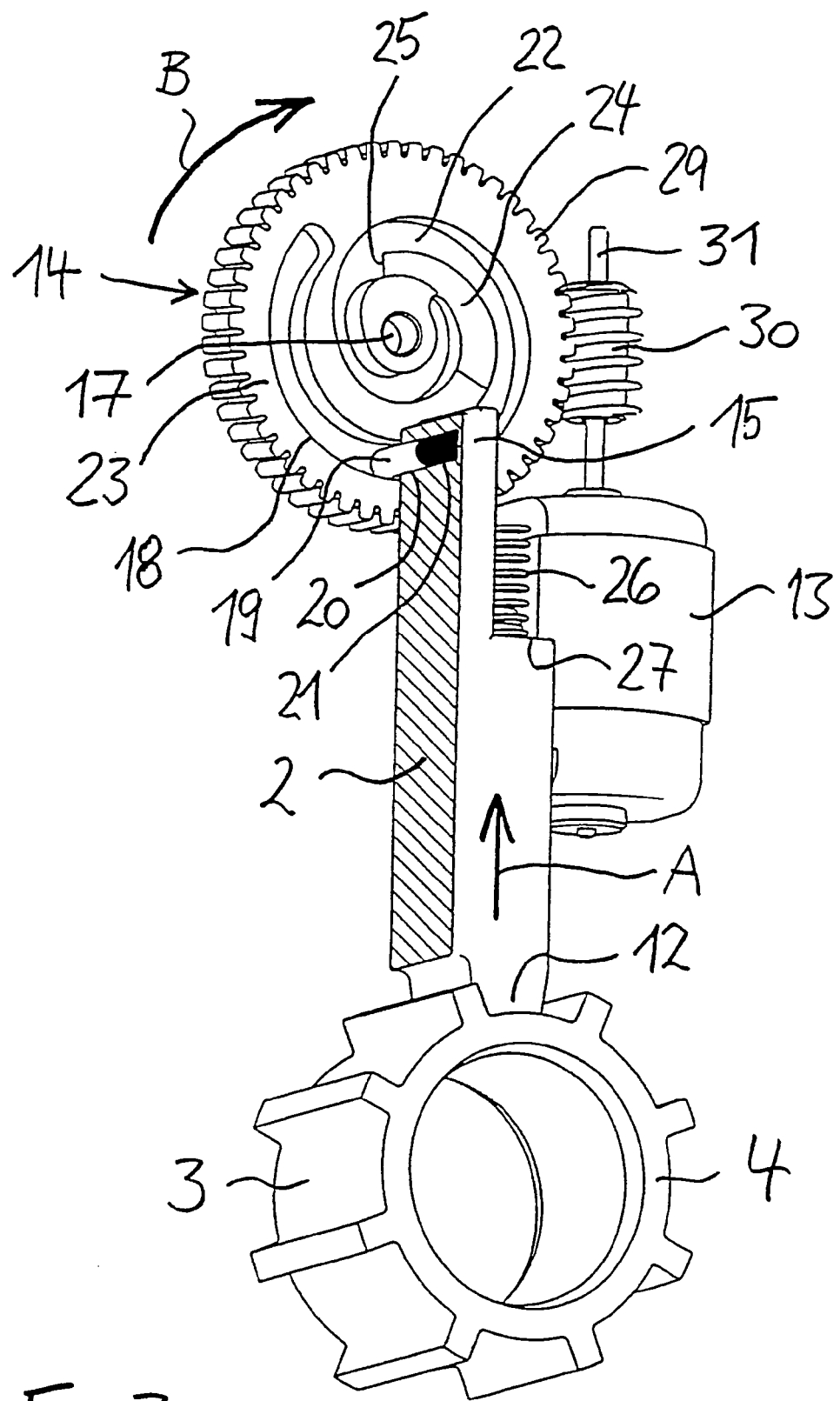
FIG. 3 is a perspective view corresponding to the view of FIG. 2, in which the locking bolt is in longitudinal section.
Figure 4:
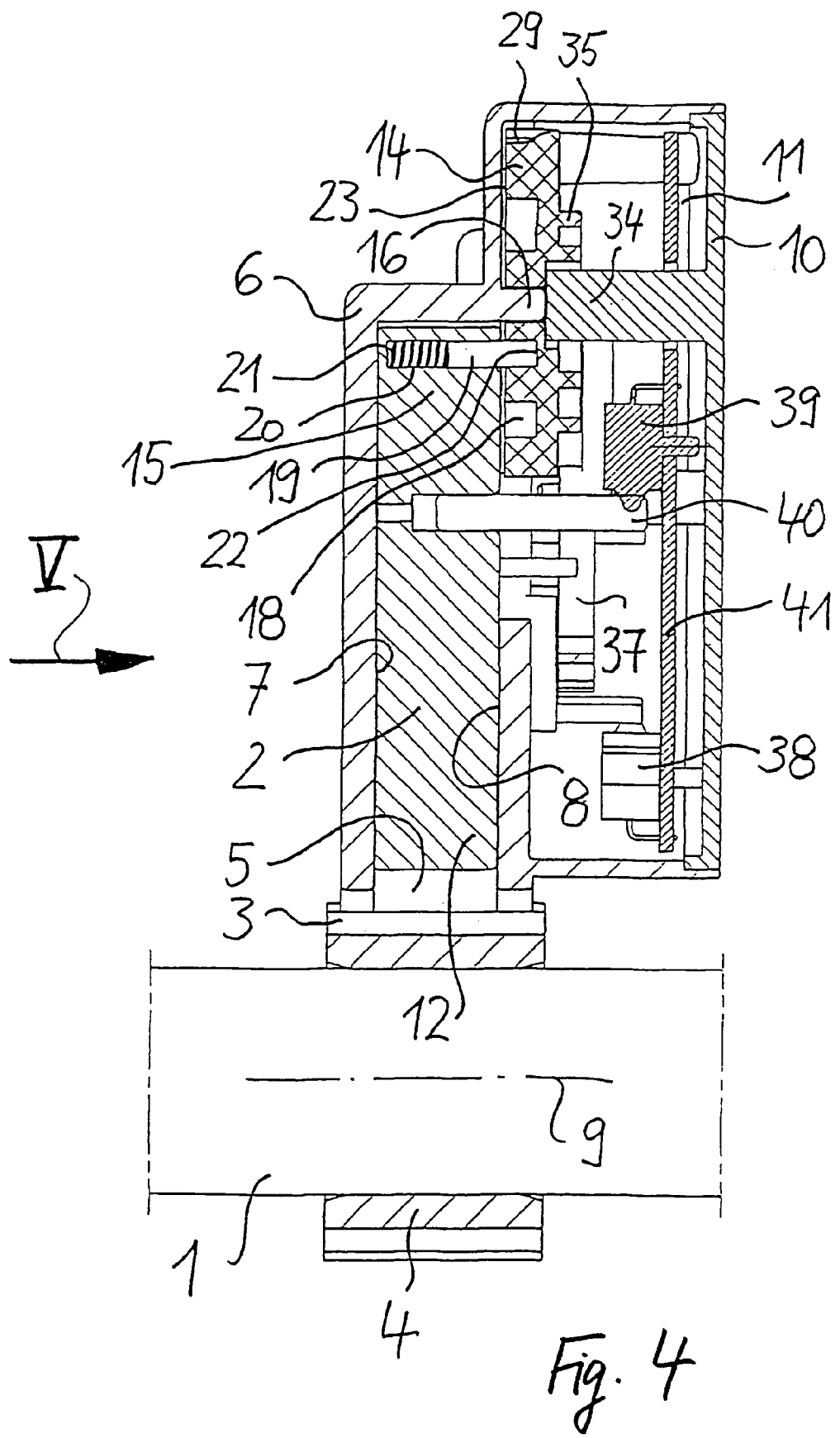
FIG. 4 is a longitudinal section along the line IV-IV in FIG. 5, in which the locking bolt is in its release position.
Figure 5:
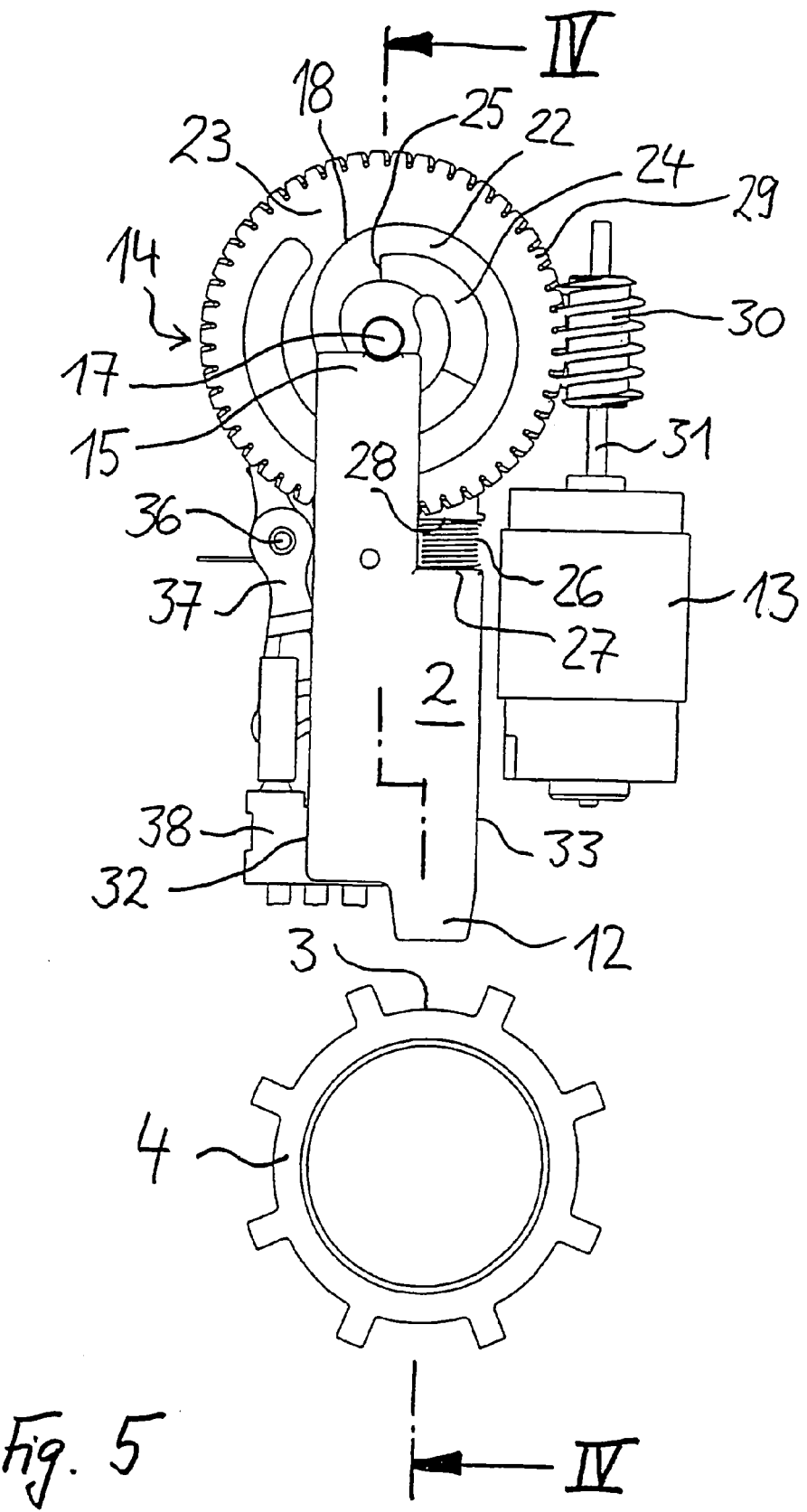
FIG. 5 is a view in the direction of the arrow V in FIG. 4, without the housing, housing cap and printed circuit board and without the steering shaft.
Figure 6:
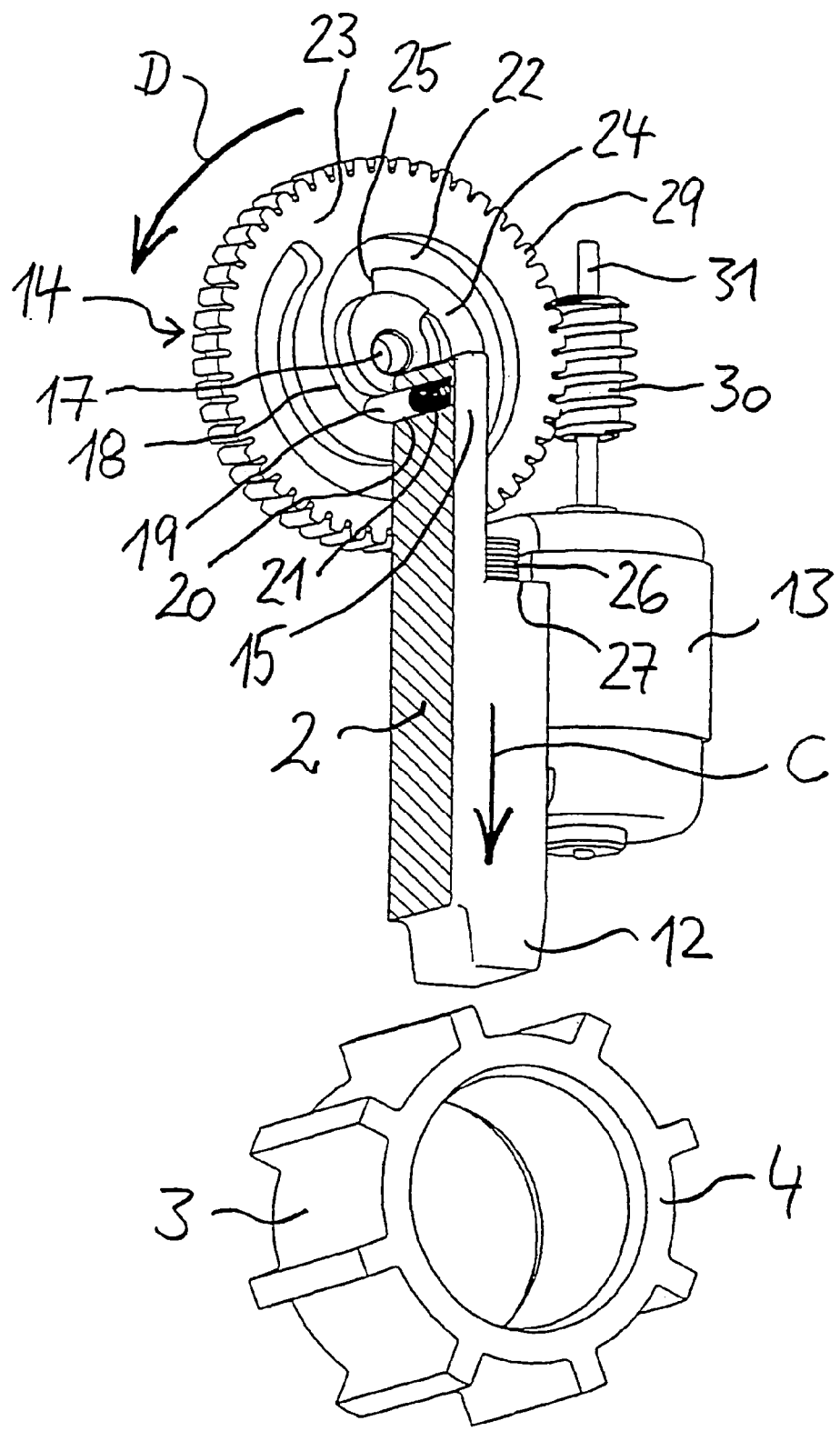
FIG. 6 is a perspective view corresponding to the view of FIG. 5, in which the locking bolt is in longitudinal section.
Figure 7:
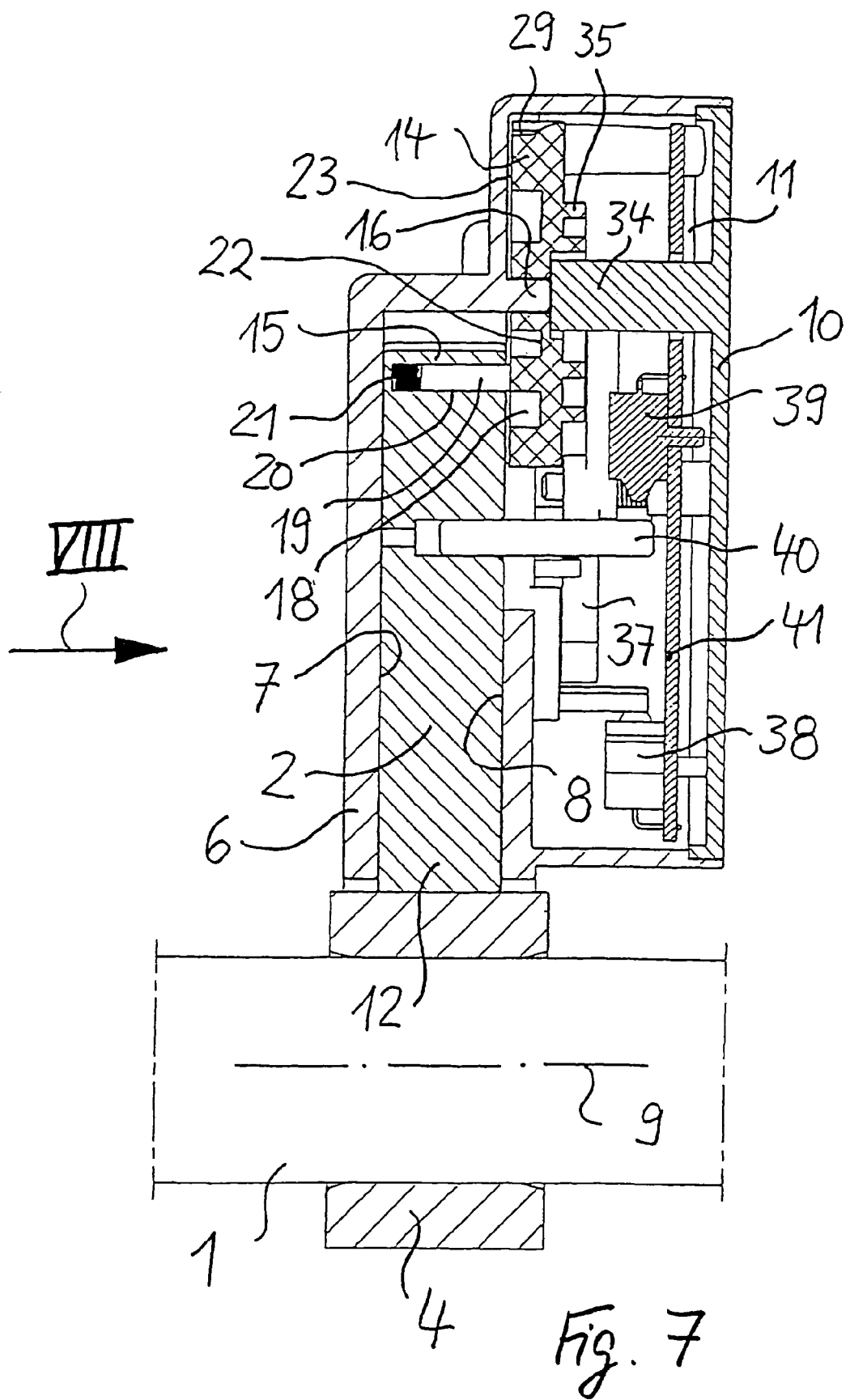
FIG. 7 is a longitudinal section along the line VII-VII in FIG. 8, in which the locking bolt is in a prelocking position.
Figure 8:
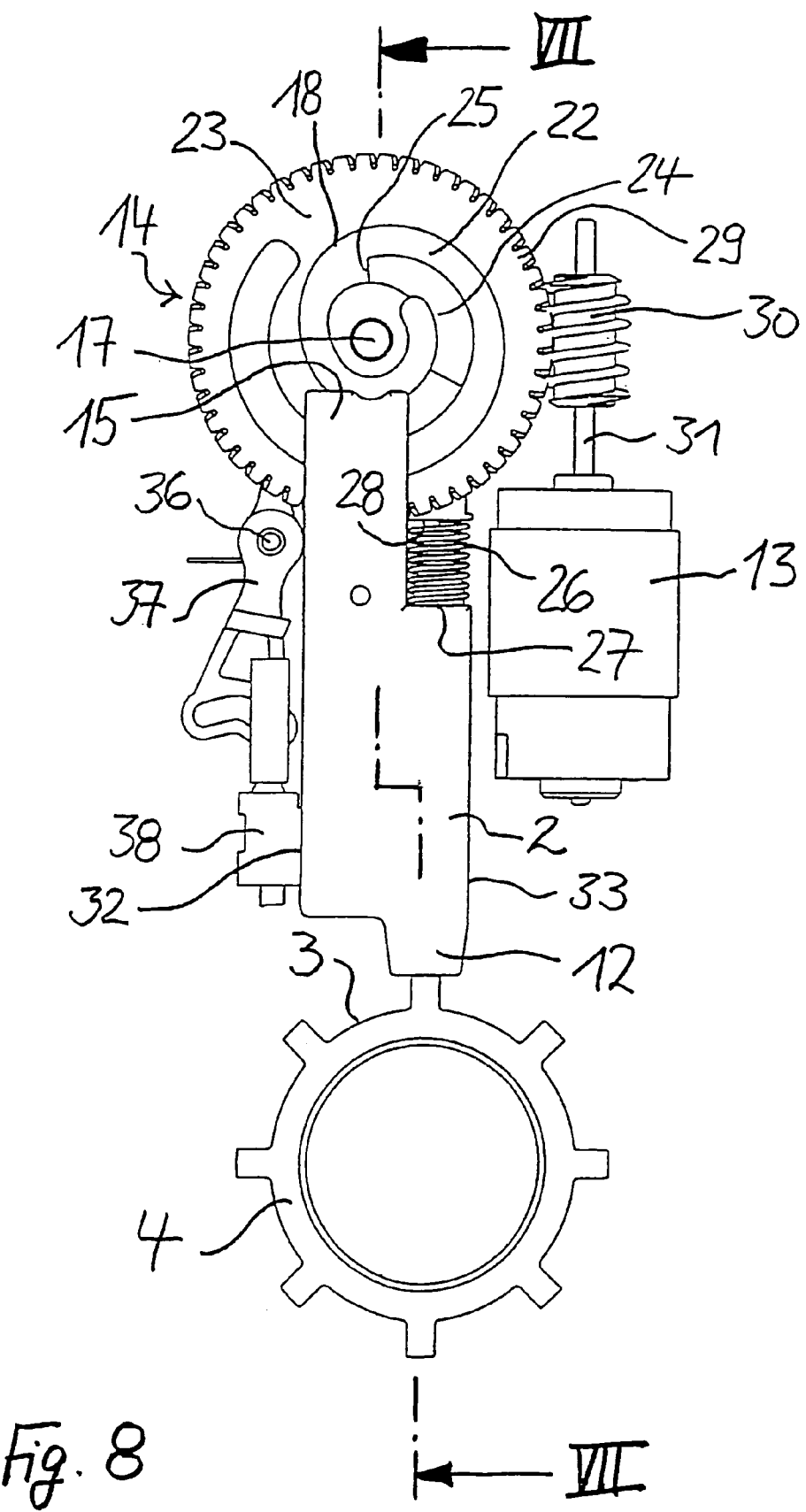
FIG. 8 is a view in the direction of the arrow VIII in FIG. 7 without the housing, housing cap and printed circuit board and without the steering shaft.

The locking bolt 2 is movable back and forth between the locking position, visible in FIGS. 1, 2, 3, at which, with its end 12 facing toward the steering shaft 1, it engages a locking recess 3 of the locking sleeve 4, so that the steering shaft 1 can no longer be rotated, and the release position, visible in FIGS. 4, 5, 6, at which the locking bolt 2, with the end 12, does not engage any locking recess 3 of the locking sleeve 4 and releases the steering shaft 1, so that it can be rotated.

For axial displacement of the locking bolt 2 into the release position and in the opposite direction into the locking position, a control member 14 is used, which can be rotated back and forth by means of an electric motor 13 the direction of rotation of which is reversible. On the side toward the housing cap 10 of the locking bolt 2, the control member 14 is located next to the end 15 of the locking bolt 2 remote from the steering shaft 1 and the control member 14 is supported rotatably in the housing 6 on a cylindrical protrusion 16 of the housing 6 which engages a central bearing bore 17 of the control member 14 and extends perpendicular to the two broader side faces 7, 8 of the duct 5 of the housing 6 guiding the locking bolt 2.

On the side 15 adjacent to the locking bolt 2, the control member 14 is provided with a spiral groove 18 which winds around the bearing bore 17 of the control member 14, and which is engaged by a pin 19 protruding laterally from the locking bolt 2, so that upon rotation of the control member 14 in one direction or the other, the locking bolt 2 is axially displaced in one direction or the other radially relative to the axis of rotation of the control member 14 which axis is defined by the housing protrusion 16.

The cylindrical pin 19 is supported axially displaceably in a cylindrical bore 20 provided in the end 15 of the locking bolt 2 remote from the steering shaft, and is urged in the direction towards the control member 14 by a helical compression spring 21 located in the bore 20. The control member 14 has an inclined surface 24, cooperating with the pin 19 in the way described hereinafter and rising from the bottom 22 of the spiral groove 18 to the flat surface 23 of the control member 14 facing toward the locking bolt 2; this inclined surface 24 extends along the spiral groove 18 and begins at a point 25, explained hereinafter, on the bottom 22 of the spiral groove 18. The locking bolt 2 is urged in the direction towards the steering shaft 1 by a helical compression spring 26, which is supported on one end on a shoulder 27 of the locking bolt 2 and on the other on a shoulder 28 of the housing 6.

The control member 14 is formed as a circular disk with circumferential teeth 29 which are engaged by a drive worm 30 that is secured to the output shaft 31 of the electric motor 13. The electric motor 13 is disposed in the housing 6 next to the locking bolt 2, so that its output shaft 31 extends parallel to the two narrower side faces 32, 33 of the locking bolt 2.

The control member 14 is axially fixed on the cylindrical protrusion 16 of the housing 6 by means of a cylindrical protrusion 34 of greater diameter of the housing cap 10, and on the end face remote from the locking bolt 2 it is provided with a protruding spiral rib 35 which winds around the bearing bore 17 of the control member 14 and with which a spring-loaded, two-armed pivot lever 37, which is pivotable in the housing 6 about an axis 36 parallel to the housing protrusion 16, cooperates in order to actuate an electric switch 38 both in the rotary position of the control member 14 corresponding to the locking position of the locking bolt 2 and in the rotary position of the control member 14 corresponding to the release position of the locking bolt 2. A further electric switch 39 is actuated by a pinlike lateral protrusion 40 of the locking bolt 2 when the locking bolt 2 assumes its release position. The two electric switches 38, 39 are disposed on a printed circuit board 41 which is mounted in the housing 6 and which extends parallel to the housing cap 10.

Figure 9:
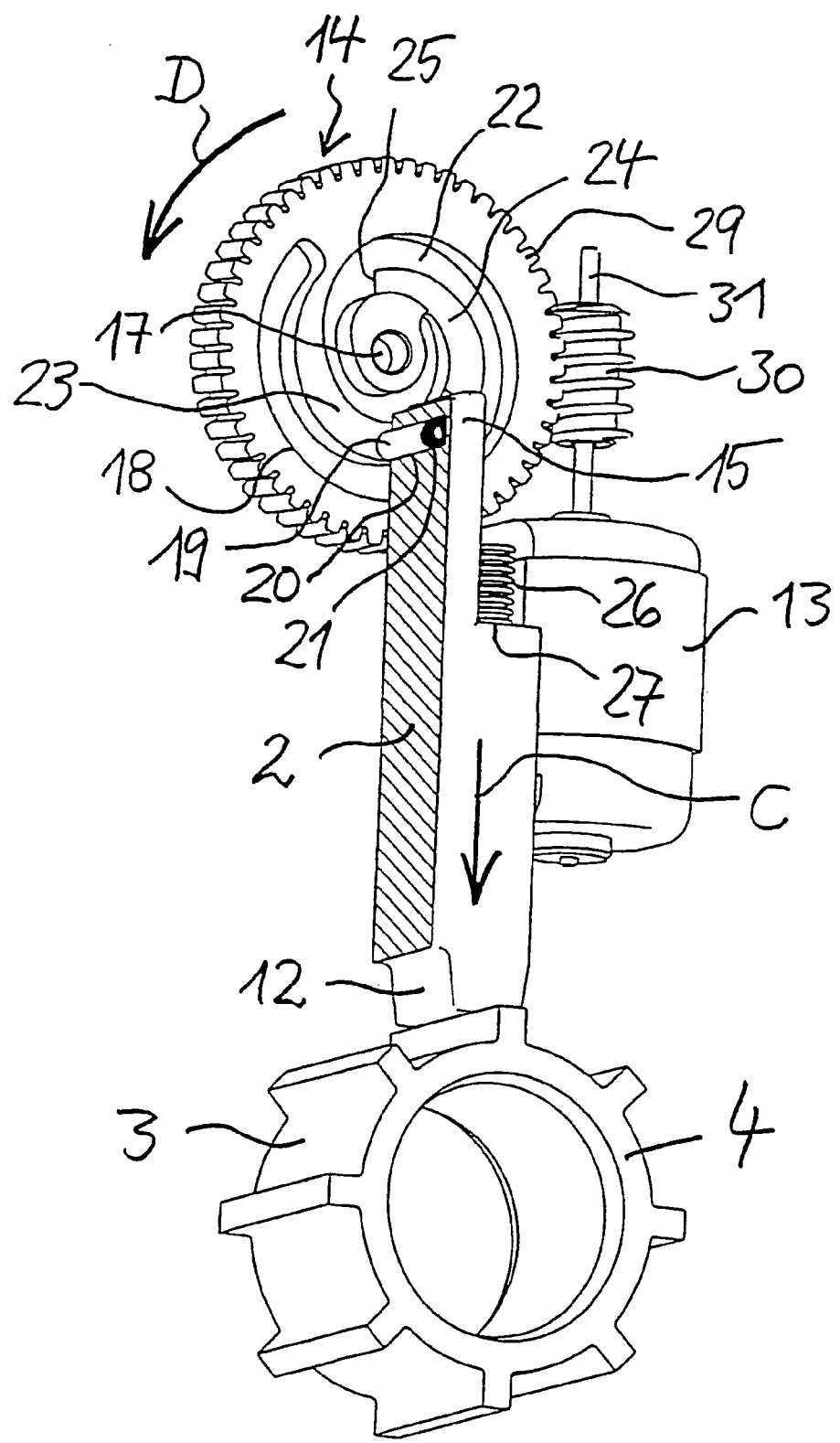
FIG. 9 is a perspective view corresponding to the view of FIG. 8, in which the locking bolt is in longitudinal section.

The mode of operation of the device described for locking the steering shaft 1 against rotation can be seen especially clearly from FIGS. 3, 6 and 9:

In order to displace the one-piece locking bolt 2 axially out of the locking position of FIG. 3 in the direction of the arrow A into the release position of FIG. 6, the electric motor 13 is switched on so that its output shaft 31, via the drive worm 30, rotates the control member 14 in the direction of the arrow B, and the pin 19 of the locking bolt 2 moves closer and closer in the spiral groove 18 of the control member 14 to the axis of rotation (bearing bore 17) of the control member 14.

In order to displace the one-piece locking bolt 2 axially out of the release position of FIG. 6 in the direction of the arrow C into the locking position of FIG. 3, the electric motor 13 is switched on so that its output shaft 31, via the drive worm 30, rotates the control member 14 in the direction of the arrow D, and the pin 19 of the locking bolt 2 moves farther and farther away in the spiral groove 18 of the control member 14 from the axis of rotation (bearing bore 17) of the control member 14.

If, when the control member 14 rotates in the direction of the arrow D, no locking recess 3 of the steering shaft 1 or of its locking sleeve 4 is located in front of the one-piece locking bolt 2, or its end 12, facing toward the steering shaft, then the locking bolt 2 or its end 12 cannot enter into a locking recess 3, and the locking bolt 2 cannot move into its locking position but instead can move only into the prelocking position of FIG. 9. As soon as the locking bolt 2 due to its axial displacement in the direction of the arrow C reaches this prelocking position, the pin 19 of the locking bolt 2 rests with its free end at the point 25 on the bottom 22 of the spiral groove 18 of the control member 14. Upon further rotation of the control member 14 in the direction of the arrow D, the pin 19 slides with its free end along the inclined surface 24 of the control member 14 onto the plane surface 23, thereof facing toward the locking bolt 2 in order to move against the action of the helical compression spring 21 back into the bore 20 of the locking bolt 2 and to leave the spiral groove 18 of the control member 14, so that the control member 14 can be rotated onward in the direction of the arrow D until it reaches the position corresponding to the locking position of the locking bolt 2, as is shown in FIG. 9.

From the prelocking position of FIG. 9, the one-piece locking bolt 2, under the influence of its helical compression spring 26, readily enters the locking position of FIG. 3 when the steering shaft 1 with the locking sleeve 4 is rotated out of the position shown in FIG. 9 into the position shown in FIG. 3, at which a locking recess 3 of the locking sleeve 4 is aligned with the adjacent end 12 of the locking bolt 2. Simultaneously, the pin 19 of the locking bolt 2 slides with its free end on the flat surface 23 of the control member 14, in order finally to be pushed forward again by its helical compression spring 21 out of the bore 20 of the locking bolt 2 into engagement with the spiral groove 18 of the control member 14.

The invention claimed is:

1. Device for locking the steering shaft of a motor vehicle against rotation comprising:
   a locking bolt cooperating with locking recesses of the steering shaft and a control member rotatable back and forth displacing the locking bolt back and forth radially relative to the axis of rotation of the control member between a steering shaft locking position and a steering shaft release position;
   said locking bolt being formed in one piece, and having a laterally protruding pin displaceably supported in the locking bolt and being spring-loaded in a direction towards the control member;
   said control member being provided on an end face of the control member adjacent to the locking bolt with a spiral groove which winds around the axis of rotation of the control member and which is engaged by the pin of the locking bolt;
   said control member having an inclined surface cooperating with the pin of the locking bolt and rising from the bottom of the spiral groove of the control member to a flat surface thereof facing toward the locking bolt, so that the pin of the locking bolt is moved out of the spiral groove of the control member against the action of its spring, when the control member is rotated into the position corresponding to the locking position of the locking bolt and no locking recess of the steering shaft is located in front of the locking bolt and the locking bolt cannot move into its locking position.

2. The device according to claim 1, wherein the inclined surface of the control member extends along the spiral groove of the control member and begins at a point on the bottom of the spiral groove at which the pin of the locking bolt rests upon rotation of the control member for displacement of the locking bolt out of the release position into the locking position, when no locking recess of the steering shaft is located in front of the locking bolt and the locking bolt cannot move into its locking position.

3. The device according to claim 1, wherein the locking bolt is spring-loaded in a direction towards the steering shaft.

4. The device according to claim 1, wherein the control member is formed as a circular disk with circumferential teeth engaged by a drive pinion or a drive worm.

5. The device according to claim 4, wherein an electric motor with reversible direction of rotation rotates the drive pinion or the drive worm.

6. The device according to claim 5, wherein the electric motor is disposed coaxially relative to the drive worm and next to the locking bolt.

* * * * *